United States Patent [19]

Fukayama et al.

[11] Patent Number: 4,487,907

[45] Date of Patent: Dec. 11, 1984

[54] RTV POLYORGANOSILOXANE COMPOSITIONS YIELDING PAINTABLE ELASTOMERS

[75] Inventors: Miyoji Fukayama; Chikara Ichijo, both of Ichihara, Japan

[73] Assignee: Toray Silicone Co., Ltd., Tokyo, Japan

[21] Appl. No.: 560,705

[22] Filed: Dec. 12, 1983

[51] Int. Cl.$^3$ .............................................. C08G 77/20
[52] U.S. Cl. ...................................... 528/32; 528/34; 528/901; 427/387
[58] Field of Search .................... 427/387; 528/32, 34, 528/901

[56] References Cited

U.S. PATENT DOCUMENTS 4,311,737  1/1982  Ishizaka et al. .................. 528/34

Primary Examiner—Melvyn I. Marquis
Attorney, Agent, or Firm—Robert Spector

[57] ABSTRACT

Cured elastomers prepared by the reaction of a hydroxyl-terminated polyorganosiloxane with curing agents containing silicon-bonded aminoxy and/or amido groups can be painted when a dialkoxysilane of the formula $X'R^1SiR^2(OR^3)_2$ is present in the curable composition. In the foregoing formula $R^1$ is alkylene, haloalkylene or oxyalkylene, $R^2$ and $R^3$ are individually hydrocarbon, alkoxy-hydrocarbon or halohydrocarbon radicals and $X'$ is glycidoxy, mercapto, acryloxy, methacryloxy, $NH_2$, $-N(C_2H_5)_2$ or $-N(H)CH_2CH_2NH_2$.

14 Claims, No Drawings

RTV POLYORGANOSILOXANE COMPOSITIONS YIELDING PAINTABLE ELASTOMERS

BACKGROUND OF THE INVENTION

1. Field of the Invention

This invention relates to room-temperature-vulcanizable (RTV) organosilicon compositions. More particularly, this invention relates to RTV organosilicon compositions containing a specified class of dialkoxysilanes. The resultant cured silicone rubber products can be readily coated with paint.

2. Description of the Prior Art

One part RTV organosilicon compositions are stable under conditions that exclude moisture. In the presence of atmospheric moisture the compositions form cured silicone elastomers at ambient temperature. One type of one part RTV composition contains a hydroxyl terminated polyorganosiloxane and, as the curing agent, an amido-substituted organosilicon compound, an aminoxy-substituted organosilicon compound, or mixtures thereof. In this type of composition both a difunctional organosilicon compound and one containing three or more functional groups per molecule are used as curing agents. By varying the proportion of these two types of curing agents, the physical properties of the cured elastomer can be varied over a broad range, for example, from low modulus/high elongation to high modulus/low elongation. The low modulus/high elongation elastomers are particularly useful as architectural sealants due to their excellent resistance to weather and fatigue.

A serious disadvantage of the aforementioned sealants is that the silicone rubber surface obtained following curing of the sealant either cannot be easily painted, or the paint is only weakly adhered to the surface.

European patent application No. 50453, published on Apr. 28, 1982, discloses room temperature vulcanizable compositions containing silanes or siloxanes with at least one aminoalkyl group and at least one alkoxy group per molecule as adhesion promoters. No distinction is made between compounds containing 1, 2 or 3 alkoxy groups. The examples employ only compounds containing 3 alkoxy groups or 2 alkoxy groups and one siloxy group bonded to silicon in addition to the aminoalkyl groups. No dialkoxysilanes are employed in the examples, although γ(β-aminoethylamino)propylmethyldimethoxysilane is disclosed, as is δ-aminobutylmethyldiethoxysilane. The RTV compositions also include an organosilicon compound with at least 3 hydrolyzable groups bonded to silicon, which functions as the curing agent for an essentially linear polyorganosiloxane containing terminal groups that are hydroxyl or readily hydrolyzable groups. Aminoxy and amido are among the hydrolyzable groups that can be present on the curing agent.

The prior art does not disclose cured silicone rubbers that can be painted and which are prepared by curing RTV compositions containing either dialkoxysilanes having reactive groups such as amino, acryloxy, epoxy and mercapto that are bonded to silicon by means of alkylene radicals, or hydrolysis condensation products of these dialkoxysilanes.

U.S. Pat. No. 3,812,164, which issued on May 21, 1974, and U.S. Pat. Nos. 3,836,502 and 3,836,503, both of which issued on Sept. 17, 1974, disclose imparting paintability to silicone elastomers by including certain substituted mercaptoalkylsilanes of the general formula $(RO)_3Si(CH_2)_xSY$, where x is 1, 2, 3, or 4. Y represents

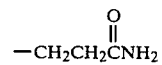

in U.S. Pat. No. 3,812,164; a residue derived from nadic anhydride or nadic methyl anhydride in U.S. Pat. No. 3,836,502; and $-CH=CHC_6H_5$ in U.S. Pat. No. 3,836,503. Each of the aforementioned substituted mercaptoalkylsilanes are prepared using a mercaptoalkyltrialkoxysilane as one of the reactants, and would therefore be most costly to produce than the mercaptoalkylsilane itself. No dialkoxysilanes are disclosed in these 3 U.S. patents.

It has now been found that certain dialkoxysilanes or hydrolysis condensation products thereof that contain at least one silicon-bonded group of the formula $-R^1X'$ will impart paintability to silicone rubbers prepared using organosilicon compounds containing amido and/or aminoxy groups as the curing agent. In the foregoing formula $R^1$ represents a divalent radical selected from the group consisting of alkylene, haloalkylene, and oxyalkylene and $X'$ represents an amino, substituted amino, mercapto, methacryloxy, acryloxy, or epoxy group.

DETAILED DESCRIPTION OF THE INVENTION

This invention provides a room temperature vulcanizable composition which is stable under conditions which exclude moisture and which cures in the presence of atmospheric moisture to form a silicone rubber having a paintable surface composition comprising the product obtained by mixing (A) 100 parts by weight of a hydroxyl-terminated polyorganosiloxane exhibiting a viscosity of from 0.02 to 1,000 Pa.s at 25° C.;

(B) from 0.5 to 30 parts by weight of at least one organosilicon compound containing at least two silicon-bonded groups per molecule selected from the groups consisting of amide, aminoxy and combinations thereof; and (C) from 0.05 to 15 parts by weight of a dialkoxysilane of the general formula $XR^1SiR^2(OR^3)_2$ or a partial hydrolysis condensation product thereof, where X represents a mercapto, acryloxy, methacryloxy, or epoxy group, $R^1$ represents an alkylene, haloalkylene or oxyalkylene radical, and $R^2$ and $R^3$ are individually selected from the group consisting of monovalent hydrocarbon radicals, monovalent alkoxyhydrocarbon radicals, and monovalent halohydrocarbon radicals.

This invention also provides a method for preparing painted, cured silicone rubber by (1) curing under ambient conditions an RTV composition of this invention that includes a dialkoxysilane of the formula $X'R^1SiR^2(OR^3)_2$, or a partial hydrolysis condensation product thereof, and (2) applying paint to at least one surface of the resultant cured composition. In the foregoing formula $R^1$, $R^2$ and $R^3$ are as defined hereinbefore. $X'$ represents any of the groups defined hereinbefore for X in addition to $-NH_2$, $-N(C_2H_5)_2$, and $-N(H)CH_2CH_2NH_2$.

The polyorganosiloxane referred to as (A) is the base material of the present compositions. Preferred embodiments of (A) include the α,ω-dihydroxypolydimethylsiloxanes represented by the general formula HO—R$_{2-n}$SiO—$_n$H where R represents a hydrocarbon, halohydrocarbon, or cyanohydrocarbon radical and the value of n is such that the viscosity of (A) is from 0.02 to 1,000 Pa.s at 25° C. However, polyorganosiloxanes which contain 3 or more hydroxyl groups per molecule by virtue of partial branching of the straight chain may also be useful as polyorganosiloxane (A).

Example of R include alkyl radicals such as methyl, ethyl, propyl, and octyl; alkenyl radicals such as vinyl and allyl; aryl radicals such as phenyl and tolyl, halogenated hydrocarbon radicals such as chloromethyl, and 3,3,3-trifluoropropyl, and cyanoalkyl radicals such as cyanoethyl. Considering the ease of synthesis and the balance between the required postcured mechanical properties and an appropriate viscosity for the uncured composition, 70% or more of the R radicals are preferably methyl. It is particularly preferable that all the R radicals be methyl.

If the viscosity of the polyorganosiloxane is less than 0.02 Pa.s, the postcured elastomer does not exhibit excellent physical properties, particularly pliability and high elongation. If the viscosity exceeds 1,000 Pa.s, the viscosity of the composition will become high and the processability becomes extremely poor. Thus, an appropriate viscosity is within the range from 0.02 to 1000 Pa.s and preferably from 0.2 to 200 Pa.s.

The organosilicon compound or compounds comprising component (B) of this invention functions to crosslink and cure the present compositions in the presence of moisture at room temperature. For this reason, two or more amide groups and/or aminoxy groups must be present per molecule of organosilicon compound. When component (A) is a polyorganosiloxane containing three or more hydroxyl groups per molecule due to partial branching of the straight chain, the crosslinking and curing processes can be carried out when only two functional groups are present per molecule of component (B). Alternatively, a combination of an organosilicon compound containing two functional groups per molecule and one containing three or more functional groups per molecule can be used as component (B).

Examples of the amide group-containing organosilicon compounds include amidosilanes such as dimethylbis(N-methylacetamido)silane, dimethylbis-(N-ethylacetamido)silane, methylvinylbis(N-methylacetamido)silane, methylvinylbis(N-butylacetamido)silane, methyltris(N-phenylacetamido)silane, vinyltris(N-ethylacetamido)silane, and tetrakis(N-methylacetamido)silane; amidosiloxanes such as CH$_3$C(O)N(CH$_3$)Si(CH$_3$)$_2$OSi(CH$_3$)$_2$N(CH$_3$)C(O)CH$_3$,
CH$_3$C(O)N(C$_2$H$_5$)[Si(CH$_3$)$_2$O]$_3$Si(CH$_3$)$_2$N(C$_2$H$_5$)-C(O)CH$_3$,

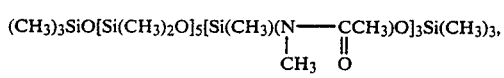

and (CH$_3$)$_3$SiO[Si(CH$_3$)$_2$O]$_3$[Si(CH$_3$)(N——CCH$_3$)O]$_4$Si(CH$_3$)$_3$;
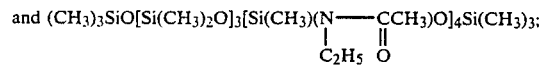

and amidocyclosiloxanes such as

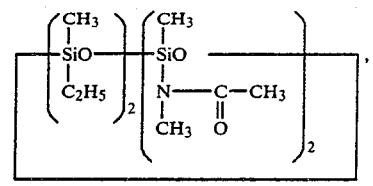

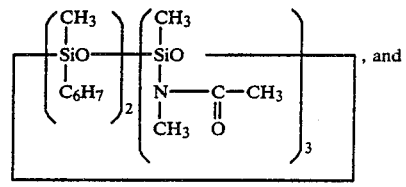

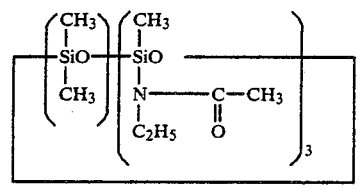

Examples of the aminoxy group-containing organosilicon compounds are as follows: aminoxysilanes such as
diphenylbis(diethylaminoxy)silane,
methyltris(diethylaminoxy)silane,
C$_6$H$_5$Si[ON(CH$_2$)$_4$]$_3$, and Si[ON(C$_2$H$_5$)$_2$]$_4$;
aminoxysiloxanes such a
(C$_2$H$_5$)$_2$NO[Si(CH$_3$)$_2$O]$_5$N(C$_2$H$_5$)$_2$,
(CH$_3$)$_3$SiO[Si(CH$_3$)$_2$O]$_4$Si(CH$_3$)[ON(C$_2$H$_5$)$_2$O]$_3$-Si(CH$_3$)$_3$, and
(CH$_3$)$_3$SiO[Si(CH$_3$)$_2$O]$_3$      Si(CH$_3$)]ON(C$_2$H$_5$)$_2$]O$_5$-Si(CH$_3$)$_3$;
and aminoxycyclosiloxanes such as

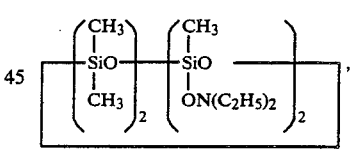

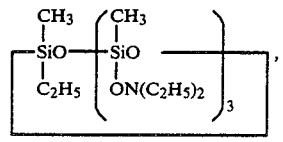

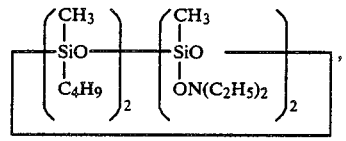

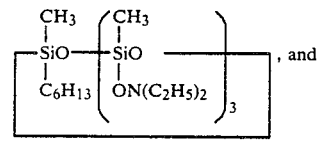

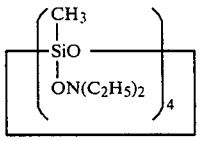

Organosilicon compounds containing both amide and aminoxy groups in the same molecule are useful, although not preferred due to difficulty of synthesis and high cost.

The curing agent, component (B), may contain one or more types of amide group-containing organosilicon compounds or one or more types of aminoxy group-containing organosilicon compounds. Alternatively, a mixture of amide-functional and aminoxy functional compounds can be employed as component (B).

In order for the curing agent to form a sufficiently cured product when reacted with the linear, hydroxyl-terminated polydiorganosiloxanes that are preferred embodiments of component (A), the curing agent must contain an average of more than two amide or aminoxy groups, or a combination thereof, per molecule. If the average number of these groups is two per molecule or less, it is difficult to form a sufficiently cured surface on the final elastomer. This invention also encompasses curing agents containing three or more amide and/or aminoxy groups per molecule.

Typically, an organosilicon compound containing two amide or aminoxy groups per molecule and one containing three or more of these functional groups per molecule are combined in appropriate amounts to form the curing agent, i.e., component (B). The relative numbers of amide and aminoxy groups in the curing agent is not critical to obtaining a sufficiently cured elastomer. It is preferable to employ a more reactive organosilicon compound as the bifunctional portion of component (B) to obtain cured elastomers exhibiting low modulus and high elongation or to improve the storage stability of the curable composition. Because amide group-containing organosilicon compounds are more reactive than aminoxy group-containing organosilicon compounds, an amide group-containing organosilicon compound or an aminoxy group-containing organosilicon compound should be used as the trifunctional or higher functional curing agent when an amide group-containing organosilicon compound is used as the bifunctional component. Correspondingly, the use of an aminoxy group-containing organosilicon compound as the trifunctional or higher functional portion of component (B) is preferred when an aminoxy group-containing organosilicon compound is used as the bifunctional portion.

If the concentration of component (B) is too low, curing will be insufficient and storage stability is poor. If too much (B) is added, the curing rate will decrease to the point that the process is economically disadvantageous. For this reason, component (B) is present in the range from 0.5 to 30 parts by weight and preferably from 1 to 20 parts by weight per 100 parts by weight of polyorganosiloxane (A).

The dialkoxysilanes or their partial hydrolysis condensation products, component (C) of the present compositions, are believed to impart paintability to the cured silicone rubber surface. Unless component (C) is added, paint cannot be coated or bonded on the surface of the cured elastomer. When component (C) is added, a variety of paints can be coated and bonded extremely easily. The reasons for using dialkoxysilanes or their partial hydrolysis condensation products as component (C) are as follows. When, for example, a trialkoxysilane compound is used, paintability is inferior to that obtained using a dialkoxysilane. In addition, the surface of the cured composition is too tacky and the uncured composition is so flowable that the utility decreases. Furthermore, there are large variations in the strength of post-cured silicone rubber prepared from a specified composition, and it is therefore difficult to control the strength of the silicone rubber.

Component (C) includes dialkoxysilanes corresponding to the general formula

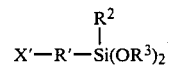

or their partial hydrolysis condensation products. In the foregoing formula, X' represents a monovalent group selected from mercapto, amino, acryloxy, methacryloxy, epoxy, and groups of the formula

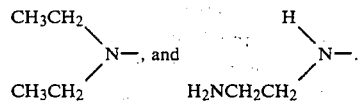

$R^1$ represents an alkylene, haloalkylene or oxyalkylene radical, or radicals containing haloalkylene and oxyalkylene portions. $R^1$ can be, for example, ethylene, propylene, butylene, chloroethylene, fluoroethylene, phenylene, —CH$_2$OCH$_2$CH$_2$CH$_2$—, —CH$_2$CH$_2$OCH$_2$CH$_2$—, —CH$_2$OCH(CH$_3$)CH$_2$—, and —CH$_2$OCH$_2$CH$_2$OCH$_2$CH$_2$—; and divalent organic groups consisting of combinations of two or more groups selected from the above-mentioned groups. $R^2$ and $R^3$ represent monovalent hydrocarbon, alkoxyhydrocarbon or halohydrocarbon radicals. Specific examples of radicals represented by $R^2$ and $R^3$ include methyl, ethyl, propyl, octyl, phenyl, vinyl, and 3,3,3-trifluoropropyl. Alkyl or alkoxyalkyl are particularly suitable $R^3$ radicals.

Examples of dialkoxysilanes useful as component (C) include mercapto group-containing dialkoxysilanes such as γ-mercaptopropylmethyldimethoxysilane, δ-mercaptobutylmethyldimethoxysilane and δ-mercaptobutylmethyldiethoxysilane; amino group-containing dialkoxysilanes such as γ-aminopropylmethyldimethoxysilane, γ-aminopropylmethyldiethoxysilane and γ-(β-aminoethylamino)propylmethyldimethoxysilane; acryloxy group-containing dialkoxysilanes such as γ-acryloxypropylmethyldimethoxysilane, γ-acryloxypropylmethyldimethoxysilane; epoxy group-containing dialkoxysilanes such as γ-glycidyloxypropylmethyldimethoxysilane and β-(3,4-epoxycyclohexyl)ethylmethyldimethoxysilane and the partial hydrolysis condensation products of any of the aforementioned dialkoxysilanes.

The concentration of component (C) ranges from 0.05 to 15 parts by weight, preferably from 0.1 to 5 parts by weight, per 100 parts by weight of component (A). If the concentration is too low, paint coatability is insufficient for practical applications; however, if too much (C) is added, the composition becomes too costly to produce.

In addition to components (A), (B), and (C), finely divided inorganic fillers are preferably added to the present compositions in order to improve the flow characteristics before curing and to impart the postcured mechanical properties desirable for a sealant. The amount of addition of inorganic filler ranges from 5 to 500 parts by weight, preferably from 20 to 300 parts by weight, per 100 parts by weight of component (A). Examples of the inorganic fillers are fumed silica, calcined silica, precipitated silica, fine quartz powder, calcium carbonate, titanium oxide, diatomaceous earth, aluminum hydroxide, alumina and any of the above-mentioned inorganic fillers whose surfaces have been treated with silanes, silazanes, siloxanes with a low degree of polymerization or organic compounds. When used as sealants in construction applications, particularly when a combination of low modulus and high elongation is required, the use of calcium carbonate is suitable. Moreover, additives such as organic solvents, antifungal agents, flame retardants, plasticizers, thixotropic agents, and adhesion promoters may be added to the compositions of this invention.

Unlike conventional silicone sealants, the cured compositions of this invention are elastomers on which a variety of paints can be coated or adhered. The compositions of this invention can therefore be applied to the sealing of seams in the exterior walls of buildings which require painting following sealant application, and for the adhesion of specially colored parts. In the latter instance, it is not necessary to add colorant to the sealant in order to match the color of the part being adhered.

This invention will be illustrated in the following examples. "Parts" in the examples denotes "parts by weight." The following abbreviations are used in the examples.

$M_{50}$ = Modulus at 50% elongation
$T_{max}$ = Tensile strength at break
$E_{max}$ = Elongation at break.

The "coatability test" and "adhesion test" referred to in the examples were conducted according to the following procedures.

COATABILITY TEST

The compositions of this invention and the compositions prepared in the comparison examples were cured to form a 2.5 mm thick sheet of elastomer. A paint was coated (single coating with a paint brush) over 5 cm² of the surface. Coatability was evaluated by the degree of paint repellency. The results were rated as follows:
O = uniform coating over entire test area
* = coating over 50 to 90% of the test area
x = coating over 40% or less of the test area.

ADHESION TEST

Following the coatability test, coating of the sample was repeated two or three times when the paint was repelled in order to coat as much of the test area as possible. After confirming that the paint had cured sufficiently, a strip of 18 mm-wide cellophane tape was adhered to the coating and then peeled off. The nature of peeling of the paint film was examined and rated as follows:
O = excellent adhesion between the paint and elastomer
x = peeling off of the paint without resistance
* = intermediate degree of adhesion of the paint to the elastomer.

EXAMPLE 1

Fine light calcium carbonate (30 parts) and 40 parts of light calcium carbonate were blended to homogeneity together with 100 parts of an α,ω-dihydroxypolydimethylsiloxane exhibiting a viscosity of 6 Pa.s at 25° C. To 100 parts of the resultant mixture were added 1.5 parts each of

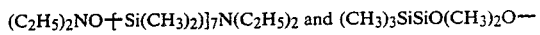

and (CH$_3$)$_3$SiSiO(CH$_3$)$_2$O—

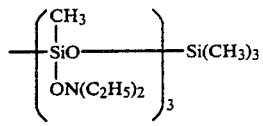

and, as component (C), 1, or 2 parts of

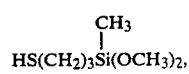

and the resultant mixture was blended to homogeneity. A 2.5 mm-thick sheet was prepared from the resultant composition and allowed to remain for one week under ambient conditions. The resultant elastomer was evaluated for coatability and adhesion as described hereinbefore. In addition, the H-joint described in JIS-A7558 (glass adherend, using Primer D supplied by Toray Silicone Company, Ltd.) was prepared and allowed to remain at room temperature for two weeks, at which time it was evaluated in a tensile test.

For purposes of comparison, a composition containing the same ingredients described in the first part of the example but without component (C) was prepared and evaluated using the aforementioned coatability, adhesion and tensile tests.

The results of all tests are reported in Table 1.

TABLE 1

| | Component (C) (parts) | Paint A Coatability | Paint A Adhesion | Paint B Coatability | Paint B Adhesion | Paint C Coatability | Paint C Adhesion | $M_{50}$ kPa | $T_{max}$ kPa | $E_{max}$ % |
|---|---|---|---|---|---|---|---|---|---|---|
| This Invention | 1 | O | O | O | * | O | O | 68.6 | 529.5 | 670 |
| This Invention | 2 | O | O | O | O | O | O | 49.0 | 451.1 | 770 |
| Comparison Example | 0 | x | x | O | x | O | x | 98.1 | 558.9 | 700 |

Paint A: synthetic resin emulsion paint (Vinyldelux 300, Kansai Paint Co., Ltd.)
Paint B: synthetic resin compound paint (CR paint, Nippon Paint Co., Ltd.)
Paint C: acrylic resin paint (AP paint, Kansai Paint Co., Ltd.)

EXAMPLE 2

Compositions similar to those disclosed in Example 1 were prepared, the only modification being that the organosilicon compounds identified in Table 2 were used instead of the HS(CH$_2$)$_3$Si(CH$_3$)(OCH$_3$)$_2$ used in Example 1. The tests disclosed in Example 1 were conducted. For convenience, the comparison example used in Example 1 is included in Table 2. The organosilicon compounds in Table 2 are identified as follows:

I: γ(β-aminoethylamino)propylmethyldimethoxysilane
II: γ-methacryloxypropylmethyldimethoxysilane
III: γ-aminopropylmethyldimethoxysilane
IV: γ-glycidoxypropylmethyldimethoxysilane.

TABLE 2

| Component (C) | Component (C) (parts) | Paint A Coatability | Paint A Adhesion | Paint B Coatability | Paint B Adhesion | Paint C Coatability | Paint C Adhesion | $M_{50}$ kPa | $T_{max}$ kPa | $E_{max}$ % |
|---|---|---|---|---|---|---|---|---|---|---|
| I | 1.0 | 0 | * | 0 | * | 0 | * | 117.7 | 872.7 | 630 |
| II | 1.5 | * | 0 | 0 | 0 | 0 | 0 | 49.0 | 362.8 | 720 |
| III | 1.0 | 0 | * | 0 | * | 0 | * | 107.9 | 774.7 | 650 |
| IV | 1.5 | * | * | 0 | 0 | 0 | * | 68.6 | 431.5 | 720 |
| Comparison example | 0 | x | x | 0 | * | 0 | x | 98.1 | 558.9 | 700 |

Paints A, B and C are identified in Table 1

EXAMPLE 3

Fine light calcium carbonate (40 parts) and 50 parts of heavy calcium carbonate were blended to homogeneity together with 100 parts of an α,ω-dihydroxypolydimethylsiloxane exhibiting a viscosity of 9 Pa.s at 25° C. To 100 parts of the resultant mixture was added 2.7 parts of

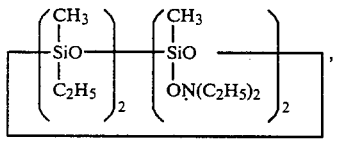

0.3 parts of

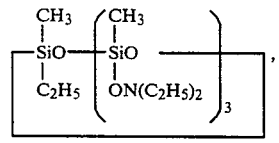

and the amount and type of component (C) disclosed in the following Table 3. A composition which contained the same ingredients as the other compositions of this example but no component (C) was used as the comparison example. The samples were tested as described hereinbefore and the results are reported in Table 3. The organosilicon compounds employed as component (C) are identified as follows in Table 3.

I: γ(β-aminoethylamino)propylmethyldimethoxysilane
IV: γ-glycidoxypropylmethyldimethoxysilane
V: γ-mercaptopropylmethyldimethoxysilane
VI: γ-aminopropylmethyldiethoxysilane
VII: γ-acryloxypropylmethyldimethoxysilane.

EXAMPLE 4

Fine light calcium carbonate (30 parts) and 70 parts of heavy calcium carbonate were blended to homogeneity together with 100 parts of an α,ω-dihydroxypolydimethylsiloxane exhibiting a viscosity of 12 Pa.s at 25° C. To 100 parts of the resultant mixture were added 4 parts of dimethylbis(N-ethylacetamido)silane, 0.5 part of

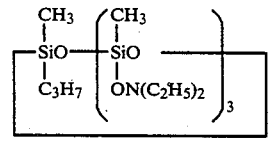

and 1 part of $HS(CH_2)_3Si(CH_3)(OCH_3)_2$. The resultant mixture was blended to homogeneity to form a composition that was cured under ambient conditions to form a 2.5 mm-thick elastomer sheet. The sheet was coated with paints A, B and C as described in Example 1 and evaluated using the aforementioned coatability and adhesion tests. All three paints exhibited satisfactory results in these tests.

That which is claimed is:

1. A room temperature vulcanizable organosilicon composition which is stable under conditions excluding moisture and which cures in the presence of atmospheric moisture to form a silicone rubber having a paintable surface, said composition comprising the product obtained by mixing
    (A) 100 parts by weight of a hydroxyl-terminated polyorganosiloxane exhibiting a viscosity of from 0.02 to 1,000 Pa.s at 25° C.;
    (B) from 0.5 to 30 parts by weight of at least one organosilicon compound containing at least two silicon-bonded groups per molecule selected from the group consisting of amide, aminoxy and combinations thereof; and
    (C) from 0.05 to 15 parts by weight of a dialkoxysilane of the general formula $XR^1SiR^2(OR^3)_2$ or a partial hydrolysis condensation product thereof, where X represents a mercapto, acryloxy, metha-

TABLE 3

| Component (C) | Component (C) (parts) | Paint A Coatability | Paint A Adhesion | Paint B Coatability | Paint B Adhesion | Paint C Coatability | Paint C Adhesion | $M_{50}$ kPa | $T_{max}$ kPa | $E_{max}$ % |
|---|---|---|---|---|---|---|---|---|---|---|
| I | 1.0 | 0 | * | 0 | * | 0 | * | 205.9 | 833.5 | 790 |
| IV | 1.0 | * | * | 0 | 0 | 0 | * | 68.6 | 431.5 | 720 |
| V | 1.5 | 0 | 0 | 0 | 0 | 0 | 0 | 137.2 | 725.6 | 980 |
| VI | 1.0 | 0 | * | 0 | * | 0 | * | 196.1 | 815.9 | 830 |
| VII | 0.5 | * | 0 | 0 | 0 | 0 | 0 | 147.1 | 745.3 | 1010 |
| Comparison example | — | x | x | 0 | * | 0 | x | 176.5 | 735.5 | 880 |

Paints A, B and C are identified in Table 1 cryloxy, or epoxy group, R$^1$ represents an alkylene, haloalkylene or oxyalkylene radical, and R$^2$ and R$^3$ are individually selected from the group consisting of monovalent hydrocarbon radicals, monovalent alkoxyhydrocarbon radicals, and monovalent halohydrocarbon radicals.

2. A composition according to claim 1 where R$^1$ represents an alkylene or oxyalkylene radical.

3. A composition according to claim 2 where R$^1$ represents propylene, butylene or —CH$_2$OCH$_2$CH$_2$CH$_2$—.

4. A composition according to claim 1 where R$^2$ and R$^3$ are alkyl.

5. A composition according to claim 4 where R$_2$ is methyl and R$^3$ is methyl or ethyl.

6. A composition according to claim 1 where the concentration of said dialkoxysilane (C) is from 0.1 to 5 parts by weight.

7. A composition according to claim 1 where said dialkoxysilane is selected from the group consisting of γ-mercaptopropylmethyldimethoxysilane, γ-methacryloxypropylmethyldimethoxysilane and γ-glycidoxypropylmethyldimethoxysilane.

8. A composition according to claim 1 where said polyorganosiloxane is a polydiorganosiloxane.

9. A composition according to claim 8 where said polydiorganosiloxane is a polydimethylsiloxane exhibiting a viscosity of from 0.2 to 200 Pa.s at 25° C.

10. A composition according to claim 1 where said polyorganosiloxane (A) is a linear polydiorganosiloxane and said organosilicon compound (B) contains an average of more than two groups per molecule selected from amide, aminoxy and combinations thereof.

11. A composition according to claim 10 where said groups are aminoxy groups.

12. A composition according to claim 11 where said groups and N,N-diethylaminoxy groups.

13. A composition according to claim 1 which contains a filler.

14. A composition according to claim 13 which contains calcium carbonate as a filler.

* * * * *

UNITED STATES PATENT AND TRADEMARK OFFICE
CERTIFICATE OF CORRECTION

PATENT NO. : 4,487,907

DATED : December 11, 1984

INVENTOR(S) : Miyoji Fukayama and Chikara Ichijo

It is certified that error appears in the above-identified patent and that said Letters Patent is hereby corrected as shown below:

Column 11, line 14 - Delete "$R_2$" and substitute therefor --- $R^2$ --- .

Column 12, line 16 - Delete "and" and substitute therefor --- are --- .

Signed and Sealed this

Sixteenth Day of July 1985

[SEAL]

Attest:

DONALD J. QUIGG

*Attesting Officer*     *Acting Commissioner of Patents and Trademarks*